United States Patent [19]

Gehrke

[11] 3,776,198
[45] Dec. 4, 1973

[54] ANIMAL LEASH
[76] Inventor: Ronald L. Gehrke, 2201 Partridge Way, Union City, Calif. 94587
[22] Filed: May 4, 1972
[21] Appl. No.: 250,268

[52] U.S. Cl. .................................................. 119/109
[51] Int. Cl. ............................................ A01k 27/00
[58] Field of Search ..................... 119/106, 109, 124; 242/107.2

[56] References Cited
UNITED STATES PATENTS

| | | | |
|---|---|---|---|
| 3,198,175 | 8/1965 | Dean | 119/109 |
| 934,114 | 9/1909 | Weaver | 242/107.2 |
| 870,784 | 11/1907 | Huff | 119/106 |
| 2,776,644 | 1/1957 | Fontaine | 119/109 |

*Primary Examiner*—Hugh R. Chamblee
*Attorney*—Joseph B. Gardner

[57] ABSTRACT

A leash for a household pet such as a dog, cat, or the like. The leash is intended to remain secured to the animal continuously so that it is always handy and available when it is desired to walk the animal. The leash includes a collar or other strap encircling the neck of the animal and secured thereto. A flexible tether is permanently attached adjacent one end to the collar by means of fastener structure accommodating relative movement therebetween, and adjacent its opposite end the tether is secured to retractable reel mechanism operative to retract the tether completely so that the reel mechanism is then disposed in very close proximity to the collar. Selectively operable stop means arranged with the reel mechanism and tether enables the latter to be constrained against retraction at any convenient length.

3 Claims, 5 Drawing Figures

PATENTED DEC 4 1973 3,776,198

ANIMAL LEASH

This invention relates to a leash for animals such as dogs, cats, other household pets, and the like; and it relates more particularly to a leash adapted to remain with the animal and be carried thereby at all times.

The leash laws in most communities are becoming more stringent and are being enforced more rigorously, and as a result it is becoming less desirable to permit a household pet (particularly a dog) to roam freely snd unleashed. As a consequence, walking such animals while they are confined on leashes is becoming increasingly prevalent. An inconvenience that is often experienced as respects walking leashed animals is the necessity of first getting the leash and securing it to the animal before the walk can commence. In this reference, the leash may be lost or misplaced which requires a search therefor, or at best the location of the leash may be known but the inconvenience of first having to get the same before the animal can be walked is nevertheless experienced.

In view of the foregoing, an object of the present invention is to provide an improved leash for dogs, cats, other household pets, and like animals which remains with the animal at all times so that it is ever convenient and ready for immediate use.

Further objects, among others, of the present invention are the provision of an improved leash of the character described that is small and compact when not in use so as to be unobtrusive and not burden the animal or otherwise inconvenience the same; that provides a reelable tether that is adjustable to any length desired within the permissible dimensional limits of the tether; that includes a strap adapted to encircle a part of the animal so as to be secured in position thereon, such as a neck-encircling collar, and to which the tether is interconnected at one end by means of fastener structure which accommodates a plurality of complex movements between the tether and strap to substantially obviate entanglement and snarling of the former; and that includes selectively operable stop means that enables the tether to be adjusted to any suitable length.

Additional objects and advantages of the invention, especially as concerns particular features and characteristics thereof, will become apparent as the specification continues.

An embodiment of the invention is illustrated in the accompanying drawing, in which.

Figure 1:
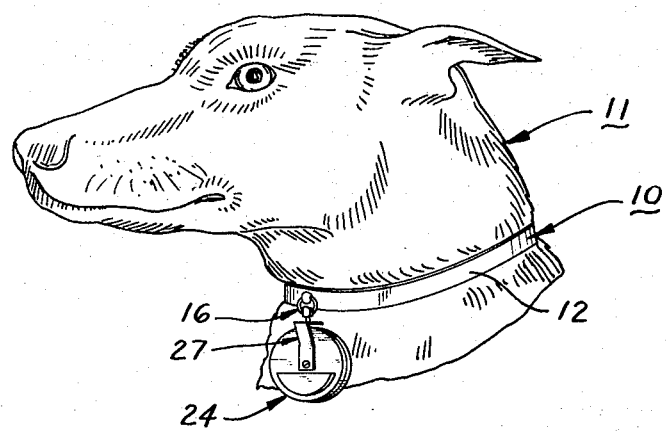
FIG. 1 is a broken perspective view illustrating an animal leash embodying the present invention in position about the neck of a dog.

An animal leash embodying the present invention is adapted for use with a variety of animals, generally household pets or domesticated animals such as dogs, cats, etc. It will be apparent that the physical size of the leash and strength thereof are advantageously related to the size and strength of the animal with which it is to be used so that an unnecessarily large leash need not be used with a very small animal. On the other hand, optimal or typical sizes may be provided, each of which is adapted to accommodate a range of animal sizes. In FIG. 1, a leash embodying the present invention is denoted in its entirety with the numeral 10, and it is depicted in association with a dog 11 of average size.

The leash 10 includes a strap 12 adapted to encircle a part of the animal 11 and be secured in position thereon. The strap 12 may take a variety of forms but usually will be a harness or collar, the latter of which is shown in the drawing, adapted to encircle the neck of the animal 11. Ordinarily, the strap 12 is removably secured about the animal by means of a buckle (not shown) which may be completely conventional and per se forms no part of the present invention. Also, the strap 12 may be formed of any usual material including leather, synthetic plastics, laminate compositions, etc.

Figure 5:
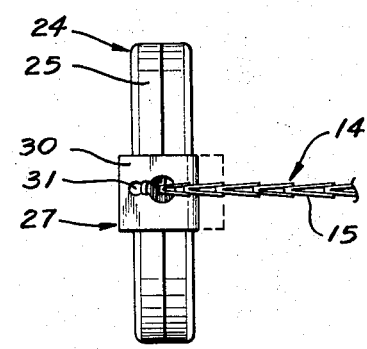
FIG. 5 is a transverse sectional view generally similar to that of FIG. 4 but showing the stop means in the release position thereof and the tether being withdrawn from the reel mechanism.

The leash 10 further includes a reelable tether 14 (FIG. 5) of predetermined length. The tether 14 may be formed of any usual material, which generally will be flexible, including rope, cord, chain, etc. In the particular embodiment of the invention being considered, the tether 14 is a link-chain constituting a plurality of pivotally interconnected links 15 which may have a tapering configuration which, as will be explained in detail hereinafter, is used in association with stop means for adjusting the effective length of the tether. Evidently, the size and strength of the tether 14 will be related to and correlated with the overall size and strength required for the leash 10.

Figure 2:
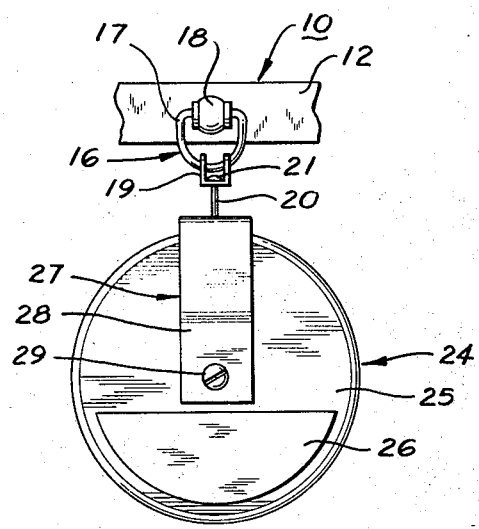
FIG. 2 is a broken front view in elevation of the animal leash shown in FIG. 1.

The tether 14 adjacent one end thereof is interconnected with the strap 12 by fastener structure 16. The fastener structure 16 defines a rotatable interconnection of the tether with the strap 12, and in more particular terms the type of interconnection establishes a generally universal-type movement. In this reference, the fastener structure includes a plurality of relatively movable elements one of which (identified with the numeral 17) is a ring-shaped element that extends into the openings of a mounting post 18 attached to the strap 12 and is pivotally or swingably movable with respect to the axis of the opening through the post. As shown in FIG. 2, the ring-shaped element 17 is swingable through an angular distance approximating 180° from the position shown in this Figure into one in which it will project upwardly above the top edge of the strap 12 rather than depend below the bottom edge of the strap as shown. A second element 19 is connected with the element 17 and is both pivotally and slidably related thereto. In this respect, the second element 19 is a bifurcated member having spaced legs provided with aligned openings therein through which the ring-shaped element 17 extends. The openings are sufficiently large to enable the element 19 to slide along the element 17 and also to pivot or swing with respect thereto.

Figure 3:
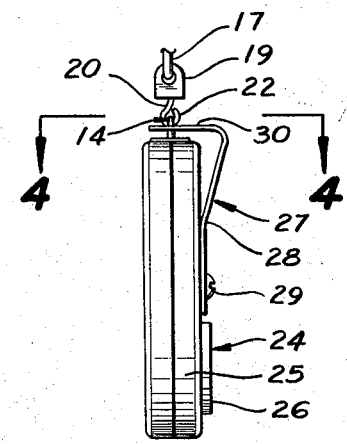
FIG. 3 is a broken side view in elevation of the leash illustrated in FIG. 2.

The fastener structure 16 further includes a third element 20 somewhat in the form of a pin that extends through the base of the U-shaped element 19 and has an enlarged head 21 that prevents separation of the elements 19 and 20 in one direction. The pin-type element 20 is displaceable in vertical directions (as viewed in FIGS. 2 and 3) with respect to the element 19, and it is freely rotatable with respect thereto. The end of the element 20 opposite the head 21 thereof is generally hook-shaped, as shown at 22, and it extends through the terminal loop 15 of the tether 14, as shown in FIG.

3. Accordingly, the fastener structure 16 rotatably interconnects the strap 12 and tether 14, and actually establishes a complex combination of permissible relative movements therebetween via the elements 17, 19, and 20, thereby enabling the animal 11 to move about quite freely adjacent one end of the tether 14 while the opposite end thereof is held or otherwise secured, all without the tether becoming snarled or tangled.

The leash 10 further includes retractable reel mechanism 24 that is secured to the tether 14 adjacent the end thereof opposite the fastener structure 16. The reel mechanism 24 is operative to retract the tether to reduce the length thereof toward a fully retracted condition in which the strap 12 and reel structure are in close proximity, as shown best in FIGS. 1 and 2. The reel mechanism 24, as respects the present invention, may be substantially conventional and by way of example, it may be a reel mechanism of the type disclosed in U.S. Pat. No. 2,732,148. In any event, it includes a two-part casing 25 having an opening through which the tether 14 extends, and located within the interior of the casing is a rotatable reel (not shown) spring biased in a direction that automatically and continuously tends to retract the tether completely. The retractable reel mechanism 24 is advantageously small and lightweight so that it does not cause discomfort to the animal 11 in being continuously carried thereby. If desired, the casing 25 may have a raised portion 26 which may be imprinted with suitably identifying indicia such as the animal's name, phone number of the owner, etc.

Figure 4:
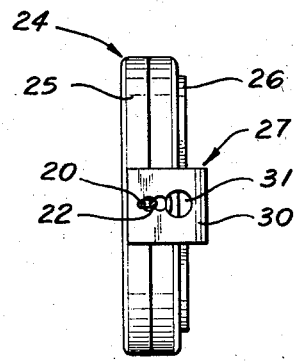
FIG. 4 is a transverse sectional view taken along the line 4—4 of FIG. 3.

Further forming a part of the leash 10 is selectively operative stop means 27 for releasably constraining the tether 14 at predetermined lengths against retraction by the reel mechanism 24. The stop means 27 may have a variety of specific forms usually related to the characteristics of the tether 14. The embodiment illustrated comprises stop means 27 of a type operative between the tether 14 and reel mechanism 24 and, in more particular reference, carried by the casing 25 of the reel mechanism. In this respect, the stop mechanism 27 takes the form of a spring clip or component of inverted, somewhat L-shaped configuration providing a stem or leg 28 extending along one side of the casing 25 and fixedly secured thereto, as by means of a screw 29. The base or leg 30 of the spring component is formed integrally with the stem 28 and is oriented so as to extend over the edge of the casing 25 in a transverse direction so as to overlie the opening in the casing through which the tether 14 extends, as shown best in FIGS. 4 and 5.

The base leg 30 of the stop means 27 has an opening 31 therein that is in the shape of a keyhole having a large generally circular portion of adequate diameter to freely pass the tether 14 therethrough, and a restricted portion in direct communication with the enlarged portion of the opening and sufficiently small to prevent movement of the tether 14 therethrough when engaging the same. The stop means 27 are manually operable or displaceable between the lock and release positions thereof respectively shown by full lines in FIGS. 4 and 5 (the latter Figure illustrating the locked position of the stop means by broken lines). Ordinarily, the inherent resilience or disposition of the stop means orients the restricted portion of the opening 31 in general alignment with the opening in the casing 25 so that the stop means are then operative between the casing (i.e., reel mechanism 24) and tether 14 so as to constrain the latter against retraction. However, the stop means 27 may be displaced transversely with respect to the reel mechanism 24 and casing 25 thereof into the released position shown in FIG. 5 in which the tether 14 is in alignment with the enlarged portion of the opening 31 so as to enable the tether either to be retracted into the casing 25 of the reel mechanism or to be withdrawn therefrom, all in accordance with the desires of one using the leash. It will be apparent that the stop means 27 can be manipulated to engage the tether 14 and constrain the same at substantially any predetermined length (the increments of adjustment in the form shown corresponding to the length of any chain link 15). Further, it is very difficult for the tether 14 to become dislodged from the stop means when engaged thereby (see FIG. 4) yet intentional release is readily effected simply by displacing the stop means 27 transversely into the position shown in FIG. 5, the tether 14 tending to be constrained against corresponding movement because of its engagement with the casing 25.

In use of the leash 10, the strap 12 is secured about the animal 11 in a customary manner, and becomes essentially a permanent fixture or companion thereof. Whenever it is desired to walk the animal, the casing 25 of the reel mechanism 24 is gripped, the stop means 27 displaced inwardly, and the tether 14 withdrawn from the reel mechanism to the length desired. The stop means 27 are then released to constrain the tether at such desired length. The length of the tether 14 can be increased and decreased (within the permissible limits defined by the maximum and minimum lengths of the tether) simply by displacing the stop means 27 into the release position shown in FIG. 5 and then either withdrawing more tether from the reel mechanism or permitting the tether to be retracted thereinto, as the case may be. Upon returning from the walk, the stop mechanism 27 is released to permit the tether to be retracted into the casing 25 by the reel mechanism 24 to the maximum permissible extent in which the reel mechanism and strap 12 are in very close proximity, as illustrated in FIG. 1.

Since the reel mechanism 24, stop means 27, fastener structure 16, and tether 14 are all relatively small and lightwieght and form a compact assemblage, they remain unobtrusively attached to the strap 12 and do not inconvenience the animal nor do they bother the same. On the other hand, the tether 14 is always ready and attached to the animal so that he can be walked at any time without first having to search for the tether, fasten the same to the animal, etc. Further, the leash can be used to confine the animal to a fixed location at home, during a walk, or otherwise simply by wrapping the tether 14 around a post or similar structure and looping the reel mechanism 24 through the tether. The enlargement defined by the reel mechanism 24 prevents the animal from pulling the tether loose from its mooring. The casing 25 also serves as a convenient and readily gripped handle for the tether 14 when the animal is being walked, and it may also serve as a safety device by having one or more reflectors secured to the casing so that lights from approaching vehicles will be reflected both while the animal is being walked and if he is permitted to run loose. The aforementioned area 26 may also represent a reflector attached to the casing 25.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A leash for a dog or like animal, comprising: a strap adapted to encircle a part of such animal and be secured in position thereon; a reelable tether of predetermined length; fastener structure rotatably interconnecting said tether adjacent one end thereof with said strap; retractable reel mechanism secured to said tether adjacent the opposite end thereof and operative to retract the same to reduce the length thereof toward a fully retracted condition in which said strap and reel structure are in close proximity; selectively operative stop means for releasably constraining said tether at predetermined lengths against retraction by said reel mechanism, said stop means being operative between said tether and reel mechanism to releasably constrain the tether at predetermined lengths; said reel mechanism including a casing into which said tether is retractable, and in which said stop means are carried by said casing and are selectively engageable with said tether to releasably constrain the same as aforesaid; said fastener structure including a plurality of relatively movable elements interconnected one with another to define a generally universal-type movement for said tether relative to said strap; said reel mechanism being automatically operative to impart a retracting force continuously to said tether tending to reduce the length thereof toward a fully retracted condition; and said stop means including a spring component secured to said casing and having an opening being generally in the shape of a keyhole and the force of said spring component normally biasing the same so that said tether is confined within the restricted portion of said opening, said tether being a flexible chain.

2. The leash of claim 1 in which one of said elements is pivotally secured to said strap, a second thereof is pivotally secured to said one element and is also slidable with respect thereto, and a third of said elements is rotatably secured to said second element to establish at least in part the aforesaid rotatable interconnection of said tether and strap.

3. A leash for a dog or like animal, comprising: a strap adapted to encircle a part of such animal and be secured in position thereon; a reelable tether of predetermined length; fastener structure rotatably interconnecting said tether adjacent one end thereof with said strap: retractable reel mechanism secured to said tether adjacent the opposite end thereof and operative to retract the same to reduce the length thereof toward a fully retracted condition in which said strap and reel structure are in close proximity; selectively operative stop means for releasably constraining said tether at predetermined lengths against retraction by said reel mechanism; a casing into which said tether is retractable, said stop means carried by said casing and selectively engageable with said tether to releasably constrain the same as aforesaid; said stop means including a spring component secured to said casing and having an opening through which said tether extends, said opening being generally in the shape of a keyhole and the force of said spring component normally biasing the same so that said tether is confined within the restricted portion of said opening, and said tether being of varying thickness alternating between enlarged sections and constricted sections along its length so as to cause it to be restrained against movement when engaged by the narrow portion of the keyhole.

* * * * *